(12) United States Patent
Roper et al.

(10) Patent No.: US 12,024,310 B2
(45) Date of Patent: Jul. 2, 2024

(54) IGNITION-SUPPRESSING DEVICES FOR SHIELDING FASTENERS, AIRCRAFT FUEL TANKS HAVING FASTENERS SHIELDED BY IGNITION-SUPPRESSING DEVICES, AND METHODS OF INSTALLING IGNITION-SUPPRESSING DEVICES IN AIRCRAFT FUEL TANKS

(71) Applicant: The Boeing Company, Chicago, IL (US)

(72) Inventors: Christopher S. Roper, Oak Park, CA (US); Mark R. O'Masta, Oak Park, CA (US); Randall C. Schubert, Istanbul (TR); Philipp A. Boettcher, Golden, CO (US)

(73) Assignee: The Boeing Company, Arlington, VA (US)

( * ) Notice: Subject to any disclaimer, the term of this patent is extended or adjusted under 35 U.S.C. 154(b) by 316 days.

(21) Appl. No.: 17/519,335

(22) Filed: Nov. 4, 2021

(65) Prior Publication Data

US 2022/0324584 A1   Oct. 13, 2022

Related U.S. Application Data

(60) Provisional application No. 63/172,245, filed on Apr. 8, 2021.

(51) Int. Cl.
*B64D 37/32* (2006.01)
*B64D 45/02* (2006.01)
*F16B 41/00* (2006.01)

(52) U.S. Cl.
CPC ............. *B64D 37/32* (2013.01); *B64D 45/02* (2013.01); *F16B 41/00* (2013.01)

(58) Field of Classification Search
CPC ....... B64D 37/32; B64D 45/02; F16B 11/006; F16B 33/004; F16B 37/14
USPC .......................................... 361/218
See application file for complete search history.

(56) References Cited

U.S. PATENT DOCUMENTS

| | | |
|---|---|---|
| 1,673,486 A | 6/1928 | Berge |
| 3,485,134 A | 12/1969 | Ott |
| 3,699,368 A | 10/1972 | Palmer |
| 3,969,786 A | 7/1976 | Peak |
| 4,013,190 A | 3/1977 | Wiggins et al. |
| 4,129,060 A | 12/1978 | Gould |
| 4,519,974 A | 5/1985 | Bravenec et al. |
| 4,636,446 A | 1/1987 | Lee |

(Continued)

FOREIGN PATENT DOCUMENTS

| | | |
|---|---|---|
| EP | 0947782 | 6/1999 |
| EP | 3120900 | 1/2017 |

(Continued)

OTHER PUBLICATIONS

"ERG Duocel® aluminum foam," product literature downloaded from ERG Aerospace website, ERGaerospace.com on Jul. 9, 2015.

(Continued)

*Primary Examiner* — Danny Nguyen
(74) *Attorney, Agent, or Firm* — Kolitch Romano Dascenzo Gates LLC

(57) ABSTRACT

An ignition-suppressing device (100) for shielding fasteners (106) comprises a ribbon (102) and receptacles (104) that are spaced apart from one another along the ribbon (102).

27 Claims, 9 Drawing Sheets

(56) References Cited

U.S. PATENT DOCUMENTS

| | | |
|---|---|---|
| 4,820,097 A | 4/1989 | Maeda et al. |
| 4,826,380 A | 5/1989 | Henry |
| 4,854,416 A * | 8/1989 | Lalikos .................. F16L 27/111 |
| | | 138/131 |
| 4,923,348 A | 5/1990 | Carlozzo et al. |
| 5,108,853 A | 4/1992 | Feres |
| 5,750,927 A | 5/1998 | Baltazar |
| 6,102,128 A | 8/2000 | Bridgeman |
| 6,494,189 B1 | 12/2002 | Chu et al. |
| 7,134,666 B2 | 11/2006 | Beyssac et al. |
| 7,584,582 B1 | 9/2009 | Hutter, III |
| 7,599,164 B2 | 10/2009 | Heeter et al. |
| 7,878,747 B2 | 2/2011 | Dean et al. |
| 7,918,081 B2 | 4/2011 | Schlichting et al. |
| 8,717,735 B2 | 5/2014 | Day et al. |
| 8,717,736 B2 | 5/2014 | Asahara et al. |
| 8,840,740 B2 | 9/2014 | Rorabaugh et al. |
| 8,894,338 B2 | 11/2014 | Dobbin et al. |
| 9,188,226 B2 | 11/2015 | Pajel et al. |
| 9,541,118 B2 | 1/2017 | Rawdon et al. |
| 9,611,052 B2 | 4/2017 | Whitlock et al. |
| 9,618,029 B2 | 4/2017 | Cameron et al. |
| 9,719,548 B2 | 8/2017 | Sprik et al. |
| 9,908,679 B2 | 3/2018 | Limbacher et al. |
| 9,939,006 B2 | 4/2018 | Song et al. |
| 9,951,804 B2 | 4/2018 | Dobbin et al. |
| 10,301,033 B2 | 5/2019 | Gaw |
| 10,501,202 B2 | 12/2019 | Roper et al. |
| 10,512,805 B2 | 12/2019 | Damazo et al. |
| 2001/0030138 A1 | 10/2001 | Bruins et al. |
| 2006/0248853 A1 * | 11/2006 | Bartley-Cho ............. F16B 5/01 |
| | | 52/782.1 |
| 2009/0194297 A1 | 8/2009 | Ortiz Teruel |
| 2010/0277849 A1 | 11/2010 | Morrill et al. |
| 2012/0181207 A1 * | 7/2012 | Cook .................... B60K 15/03 |
| | | 206/524.3 |
| 2013/0206759 A1 | 8/2013 | Würz et al. |
| 2015/0182899 A1 | 7/2015 | Bansal et al. |
| 2015/0184688 A1 | 7/2015 | Dobbin et al. |
| 2018/0001519 A1 | 1/2018 | Burgess et al. |
| 2020/0094088 A1 | 3/2020 | Damazo et al. |
| 2021/0221532 A1 * | 7/2021 | Akamatsu ............... F16B 37/14 |

FOREIGN PATENT DOCUMENTS

| | | |
|---|---|---|
| EP | 3462046 | 3/2019 |
| EP | 3593938 A | 1/2020 |
| GB | 2544804 A | 5/2017 |
| JP | 2012-126345 | 7/2012 |
| JP | 2015-519524 | 7/2015 |
| WO | WO 2014/051858 | 4/2014 |
| WO | WO 2014/172305 | 10/2014 |
| WO | WO2015000013 A1 | 1/2015 |
| WO | WO2015000013 A9 | 1/2015 |
| WO | WO2016168883 A1 | 10/2016 |
| WO | WO 2020167633 A1 | 8/2020 |

OTHER PUBLICATIONS

"HRL Researchers Develop World's Lightest Material," downloaded from HRL Laboratories website, HRL.com on Jul. 10, 2015.
"Customized Sealant Solutions: PRC® Seal Caps," PPG Aerospace, product literature downloaded from ppgaerospace.com on Sep. 7, 2016.
"POREX® Battery Vents—Flame Arrestors," Porex Corporation, product literature downloaded from porex.com on Apr. 3, 2017.
Anonymous: "Safety lamp—Wikipedia, the free encyclopedia," May 7, 2015, retrieved from the internet on Feb. 28, 2020.
Machine-generated English translation of the abstract of JP 2012-126345, downloaded from Espacenet.com on May 12, 2020.
Machine-generated English translation of the abstract of JP 2015-519524, downloaded from Espacenet.com on May 12, 2020.
European Patent Office, Extended European Search Report for related European patent application EP 22 15 6996, Jul. 14, 2022.
European Patent Office, Examination Report in related EP App. No. 22 156 996.5 issued Jan. 15, 2024.

* cited by examiner

IGNITION-SUPPRESSING DEVICES FOR SHIELDING FASTENERS, AIRCRAFT FUEL TANKS HAVING FASTENERS SHIELDED BY IGNITION-SUPPRESSING DEVICES, AND METHODS OF INSTALLING IGNITION-SUPPRESSING DEVICES IN AIRCRAFT FUEL TANKS

RELATED APPLICATION

The present application is a non-provisional of and claims priority to U.S. Provisional Patent Application No. 63/172,245, filed on Apr. 8, 2021, entitled "IGNITION-SUPPRESSING DEVICES FOR SHIELDING FASTENERS, AIRCRAFT FUEL TANKS HAVING FASTENERS, SHIELDED BY IGNITION SUPPRESSING DEVICES, AND METHODS OF INSTALLING IGNITION-SUPPRESSING DEVICES IN AIRCRAFT FUEL TANKS," the complete disclosure of which is incorporated by reference.

FIELD

The present disclosure relates to ignition-suppressing devices for shielding fasteners in aircraft fuel tanks.

BACKGROUND

Conventionally, metal fasteners in a composite aircraft fuel tank are isolated from the fuel volume by sealant and/or seal caps. The sealant and/or seal caps is/are physically and/or electrically separate the metal fasteners from the fuel volume and is/are configured to contain any ignition hazard. Installation of sealant and/or seal caps requires labor-intensive steps, such as solvent cleaning, brush coating, multiple hand-application steps, curing, and inspection. The associated installation time and inspection time increase the cost of aircraft. Furthermore, many fasteners are located sufficiently close to other fasteners so that seal caps must be custom trimmed to fit over the respective fasteners without physically interfering with adjacent fasteners or seal caps. Custom trimming further increases manufacturing lead time, and thus, cost.

SUMMARY

Accordingly, apparatuses and methods, intended to address at least the above-identified concerns, would find utility.

The following is a non-exhaustive list of examples of the subject matter, disclosed herein.

Disclosed herein is an ignition-suppressing device for shielding fasteners. The ignition-suppressing device comprises a ribbon and receptacles that are spaced apart from one another along the ribbon.

The ignition-suppressing device therefor is configured to be installed over fasteners within an aircraft fuel tank, with the fasteners extending into respective ones of the receptacles for suppression of ignition events, such as a result of lightning strikes on an aircraft. Having multiple receptacles spaced apart along the ribbon enables a supply of the receptacles to be easily dispensed during manufacture of the aircraft fuel tank, significantly reducing the time involved compared to installation of individual rigid caps in aircraft fuel tanks.

Also disclosed herein is an aircraft fuel tank. The aircraft fuel tank comprises an ignition-suppressing device, a wall, and fasteners, extending inside the aircraft fuel tank from the wall. Each of the fasteners is received by a respective one of the receptacles of the ignition-suppressing device.

Also disclosed herein is a method of installing, in an aircraft fuel tank, an ignition-suppressing device. The method comprises positioning each of the fasteners, extending inside the aircraft fuel tank from the wall of the aircraft fuel tank, within a respective one of the receptacles of the ignition-suppressing device. The method further comprises coupling the ignition-suppressing device to the wall.

BRIEF DESCRIPTION OF THE DRAWINGS

Reference will now be made to the accompanying drawings, which are not necessarily drawn to scale, and where like reference characters designate the same or similar parts throughout the several views. In the drawings.

DESCRIPTION

Figure 1:
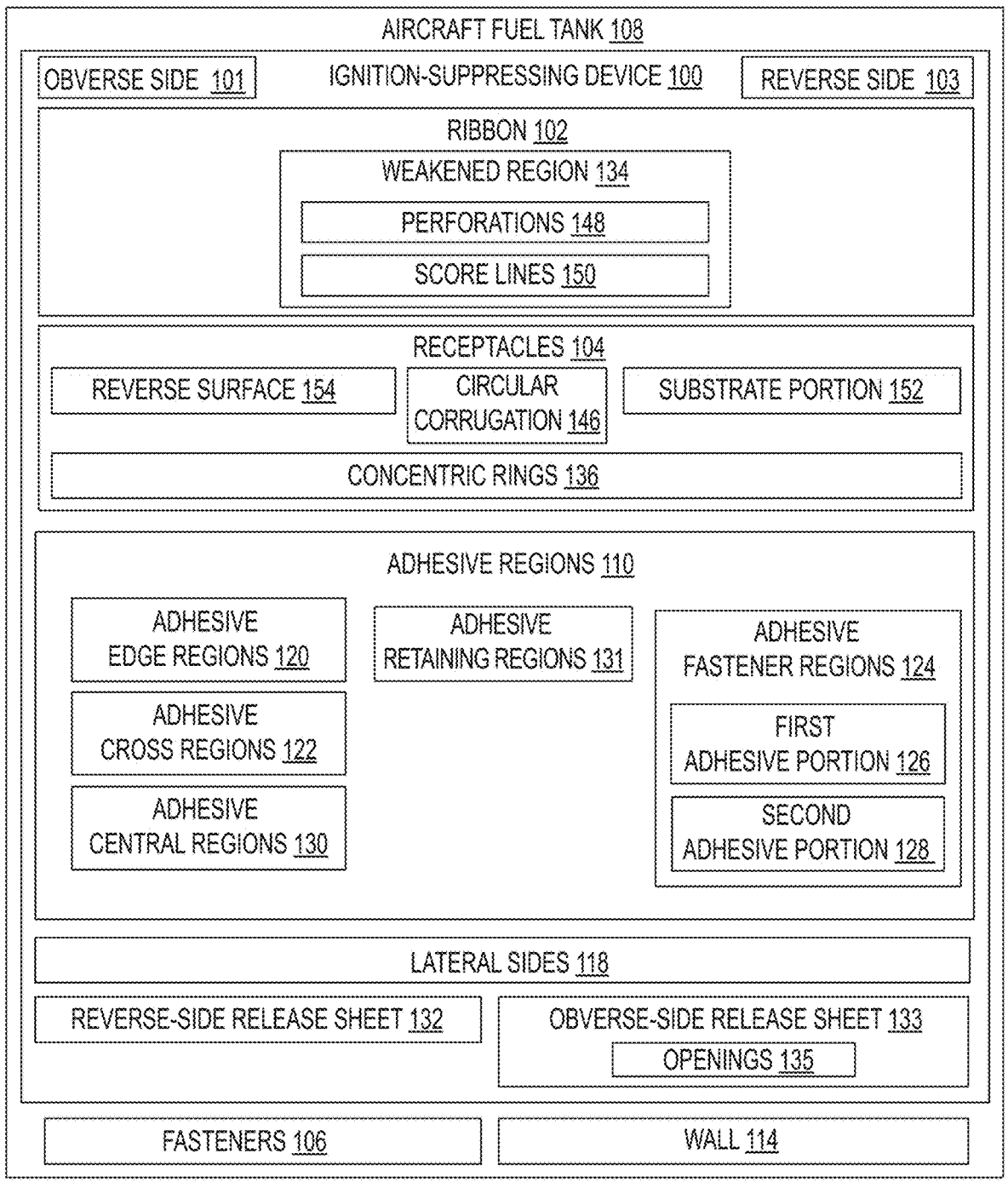
FIG. 1 is a block diagram of an ignition-suppressing device and an aircraft fuel tank, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines;

however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

Figures 10, 11:
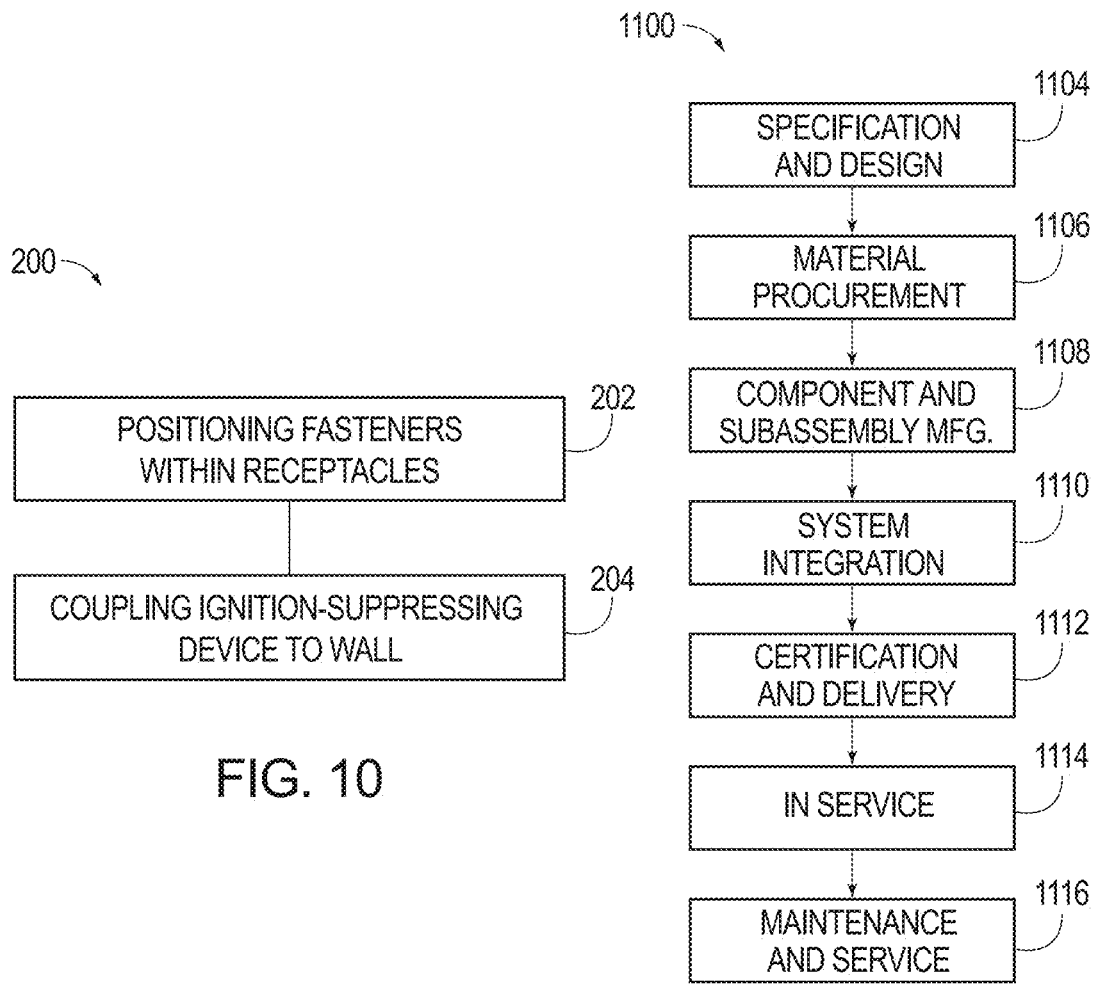
FIG. 10 is a block diagram of a method of installing, in an aircraft fuel tank, an ignition-suppressing device, according to one or more examples of the subject matter, disclosed herein.
FIG. 11 is a block diagram of aircraft production and service methodology.

In FIG. 10, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIG. 10 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2-9 for illustrative purposes only and not by way of limitation, the following portion of this paragraph delineates example 1 of the subject matter, disclosed herein. According to example 1, ignition-suppressing device 100 for shielding fasteners 106 comprises ribbon 102 and receptacles 104 that are spaced apart from one another along ribbon 102.

Ignition-suppressing device 100 therefor is configured to be installed over fasteners 106 within aircraft fuel tank 108, with fasteners 106 extending into respective ones of receptacles 104 for suppression of ignition events, such as a result of lightning strikes on an aircraft. Having multiple ones of receptacles 104 spaced apart along ribbon 102 enables a supply of receptacles 104 to be easily dispensed during manufacture of aircraft fuel tank 108, significantly reducing the time involved compared to installation of individual rigid caps in aircraft fuel tanks.

In one or more examples, ignition-suppressing device 100 is constructed with a specific spacing of receptacles 104 corresponding to a specific spacing of fasteners 106 within aircraft fuel tank 108. Accordingly, in such examples, ignition-suppressing device 100 is dispensed and installed without the need for alteration of ignition-suppressing device 100, further reducing the time involved compared to installation of individual rigid caps.

In one or more examples, ribbon 102 and/or ignition-suppressing device 100 is described as a strip.

Figure 9:
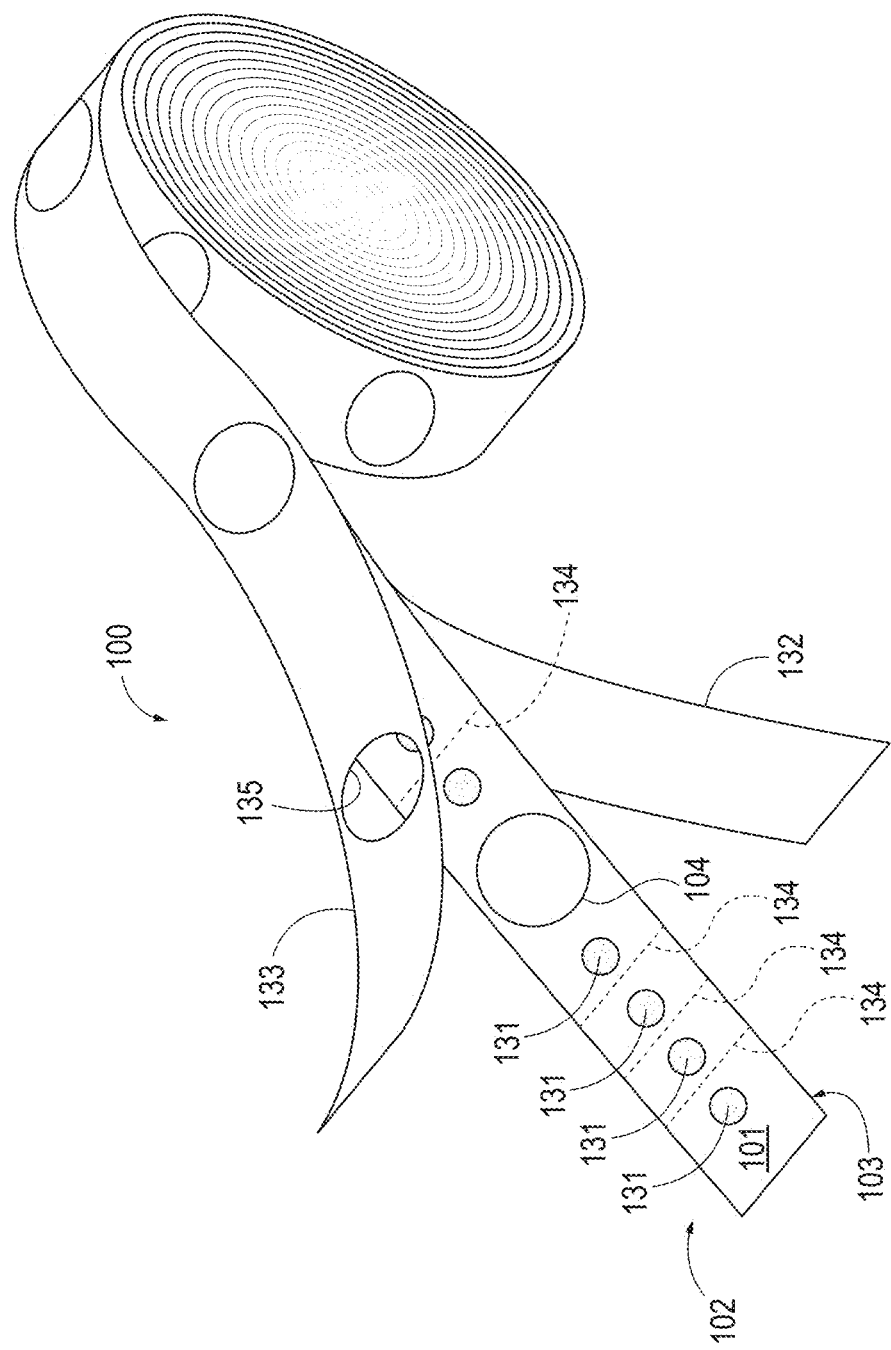
FIG. 9 is a schematic, isometric view of the ignition-suppressing device of FIG. 1, according to one or more examples of the subject matter, disclosed herein.

In one or more examples, as illustrated in FIG. 9, ignition-suppressing device 100 is able to be spooled for ease of storage and subsequent dispensing during installation within aircraft fuel tank 108.

In one or more examples, receptacles 104 and ribbon 102 are constructed of any materials to perform the functions thereof discussed herein, including materials that are compatible with aircraft fuel.

Referring generally to FIG. 1 and particularly to, e.g., FIGS. 2-9 for illustrative purposes only and not by way of limitation, the following portion of this paragraph delineates example 2 of the subject matter, disclosed herein. According to example 2, which encompasses example 1, above, ribbon 102 and receptacles 104 are constructed as a unitary structure of material.

By being constructed of the same material as a unitary structure, ignition-suppressing device 100 is easily manufactured.

As used herein, "unitary structure" simply means that ribbon 102 and receptacles 104 are unitary in nature and are not constructed separately and subsequently coupled together. "Unitary structure" does not preclude the material having multiple layers or fibers woven together, for example.

Referring generally to FIG. 1, the following portion of this paragraph delineates example 3 of the subject matter, disclosed herein. According to example 3, which encompasses example 1 or 2, above, receptacles 104 are permeable to gases, are permeable to gases and permeable to aircraft fuel, or are permeable to gases and impermeable to aircraft fuel.

By being permeable to gases, following an electrical event, resulting in combustion gases within receptacles 104, receptacles 104 enable the combustion gases to leak out of the receptacles into the fuel tank. By being permeable to gases and permeable to aircraft fuel, even if fuel vapor or liquid fuel is present in a receptacle during an electrical event, the receptacle will suppress any combustion of the fuel vapor or liquid fuel. By being impermeable to aircraft fuel, receptacles 104 not only contain the ejection of hot particles and/or gas that may result from lightning strikes or other electrical events, but also they keep aircraft fuel, which under certain conditions will vaporize and be combustible, out of receptacles 104.

In one or more examples, material that is both permeable to gases and impermeable to liquids includes woven and non-woven polymer fabrics, including stretched polytetrafluoroethylene (PTFE), such as sold under the GORE-TEX™ brand.

In one or more examples, receptacles 104 and/or ribbon 102 are constructed of multiple layers of material. In one or more such examples, a batting, such as of nylon felt, may be positioned between two outer layers of material, such as PTFE fabric.

Figure 2:
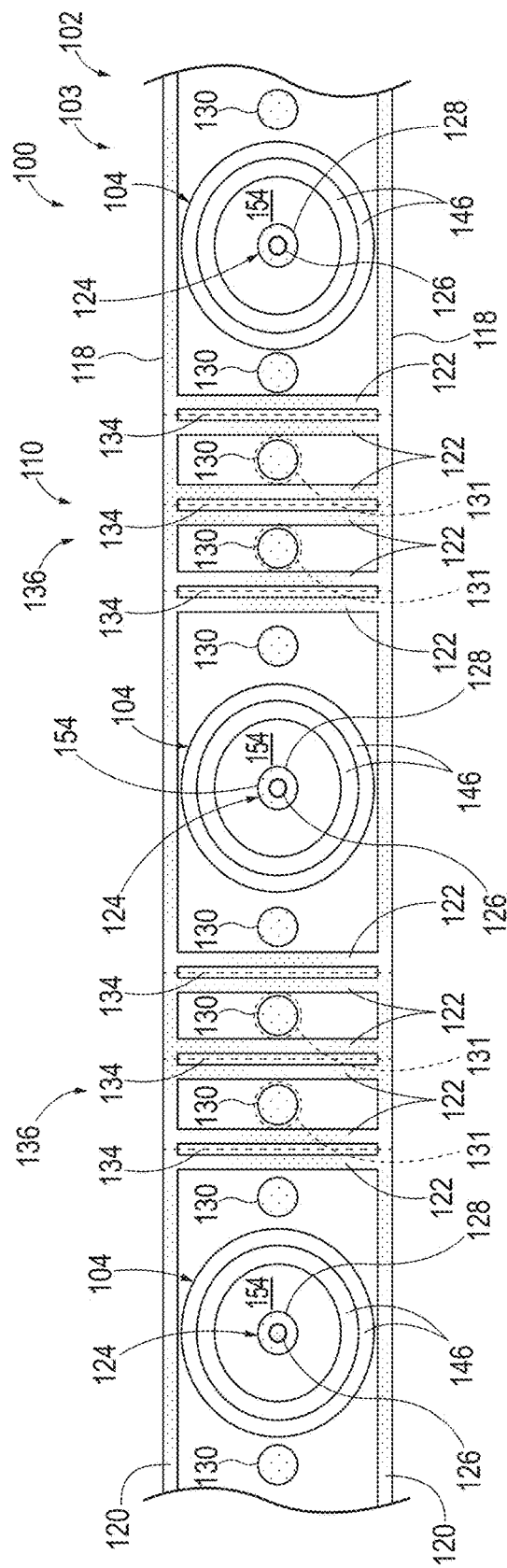
FIG. 2 is a schematic, reverse side plan view of the ignition-suppressing device of FIG. 1, according to one or more examples of the subject matter, disclosed herein.
Figure 3:
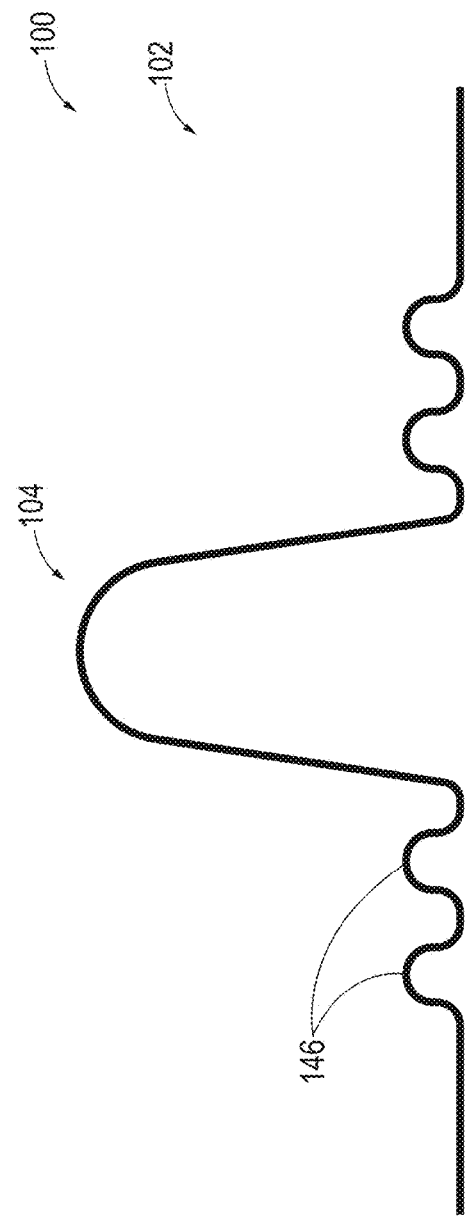
FIG. 3 is a schematic, side view of the ignition-suppressing device of FIG. 1, according to one or more examples of the subject matter, disclosed herein.

Referring generally to FIG. 1, and particularly to, e.g., FIG. 2 for illustrative purposes only and not by way of limitation, the following portion of this paragraph delineates example 4 of the subject matter, disclosed herein. According to example 4, which encompasses any one of examples 1 to 3, above, ignition-suppressing device 100 further comprises obverse side 101, reverse side 103, and lateral sides 118 between obverse side 101 and reverse side 103. Ignition-suppressing device 100 additionally comprises adhesive regions 110.

Adhesive regions 110 couple ignition-suppressing device 100 to aircraft fuel tank 108.

In one or more examples, at least a subset of adhesive regions 110 is positioned to adhere ignition-suppressing device 100 to wall 114 of aircraft fuel tank 108. In one or more additional examples, as discussed herein, at least another subset of adhesive regions 110 is positioned to adhere ignition-suppressing device 100 to fasteners 106 extending from wall 114 of aircraft fuel tank 108.

In one or more examples, adhesive regions 110 comprises any suitable adhesive compatible with the material or materials from which ignition-suppressing device 100 is constructed, with the material or materials of wall 114 and/or fasteners 106 of aircraft fuel tank 108, and with aircraft fuel.

Referring generally to FIG. 1 and particularly to, e.g., FIG. 2 for illustrative purposes only and not by way of limitation, the following portion of this paragraph delineates example 5 of the subject matter, disclosed herein. According to example 5, which encompasses example 4, above, adhesive regions 110 comprise adhesive edge regions 120, located on reverse side 103 and extending along and adjacent to lateral sides 118.

Adhesive edge regions 120 couple ignition-suppressing device 100 to wall 114 of aircraft fuel tank 108 and seal receptacles 104 from the fuel in aircraft fuel tank 108.

Referring generally to FIG. 1 and particularly to, e.g., FIGS. 2 and 6-8 for illustrative purposes only and not by way of limitation, the following portion of this paragraph delineates example 6 of the subject matter, disclosed herein. According to example 6, which encompasses example 5, above, adhesive regions 110 further comprise adhesive cross regions 122, located on reverse side 103, extending transversely to adhesive edge regions 120 between lateral sides 118, and spaced apart from one another along ignition-suppressing device 100 between receptacles 104.

With adhesive edge regions 120, adhesive cross regions 122 create an enclosed space around each of receptacles 104. Accordingly, upon an electrical event, associated with a receptacle, an adjacent receptacle will not necessarily be impacted. That is, hot particles and/or combustion gases will not travel from one receptacle to another.

Referring generally to FIG. 1 and particularly to, e.g., FIGS. 2 and 6-8 for illustrative purposes only and not by way of limitation, the following portion of this paragraph delineates example 7 of the subject matter, disclosed herein. According to example 7, which encompasses example 6, above, adhesive regions 110 further comprise adhesive central regions 130, located on reverse side 103 and spaced apart from one another along ribbon 102. Each of adhesive central regions 130 is positioned between adhesive edge regions 120.

Adhesive central regions 130 facilitate proper positioning of ignition-suppressing device 100 on wall 114 of aircraft fuel tank 108 during installation of ignition-suppressing device 100.

Figure 7:
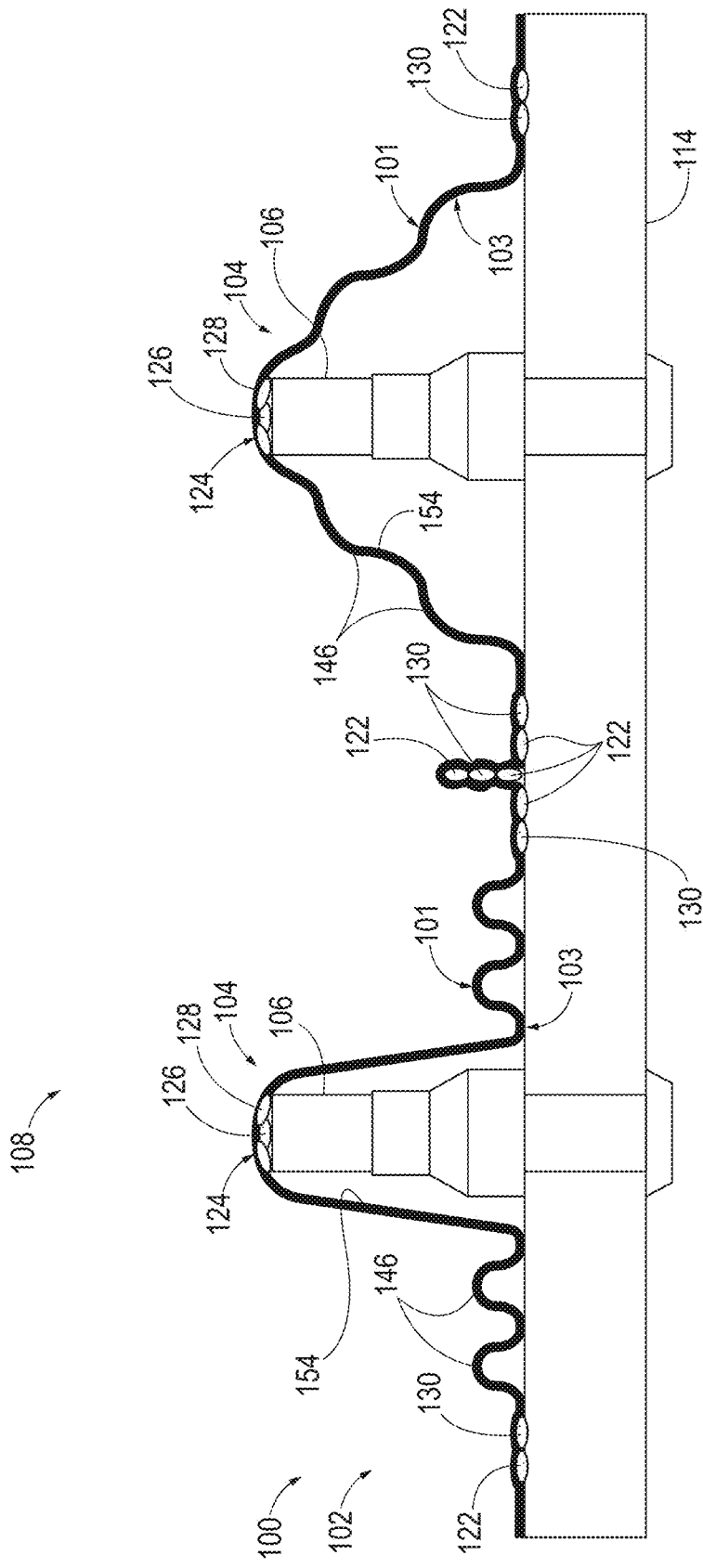
FIG. 7 is a schematic, cross-sectional side view of the aircraft fuel tank of FIG. 1, according to one or more examples of the subject matter, disclosed herein.
Figure 8:
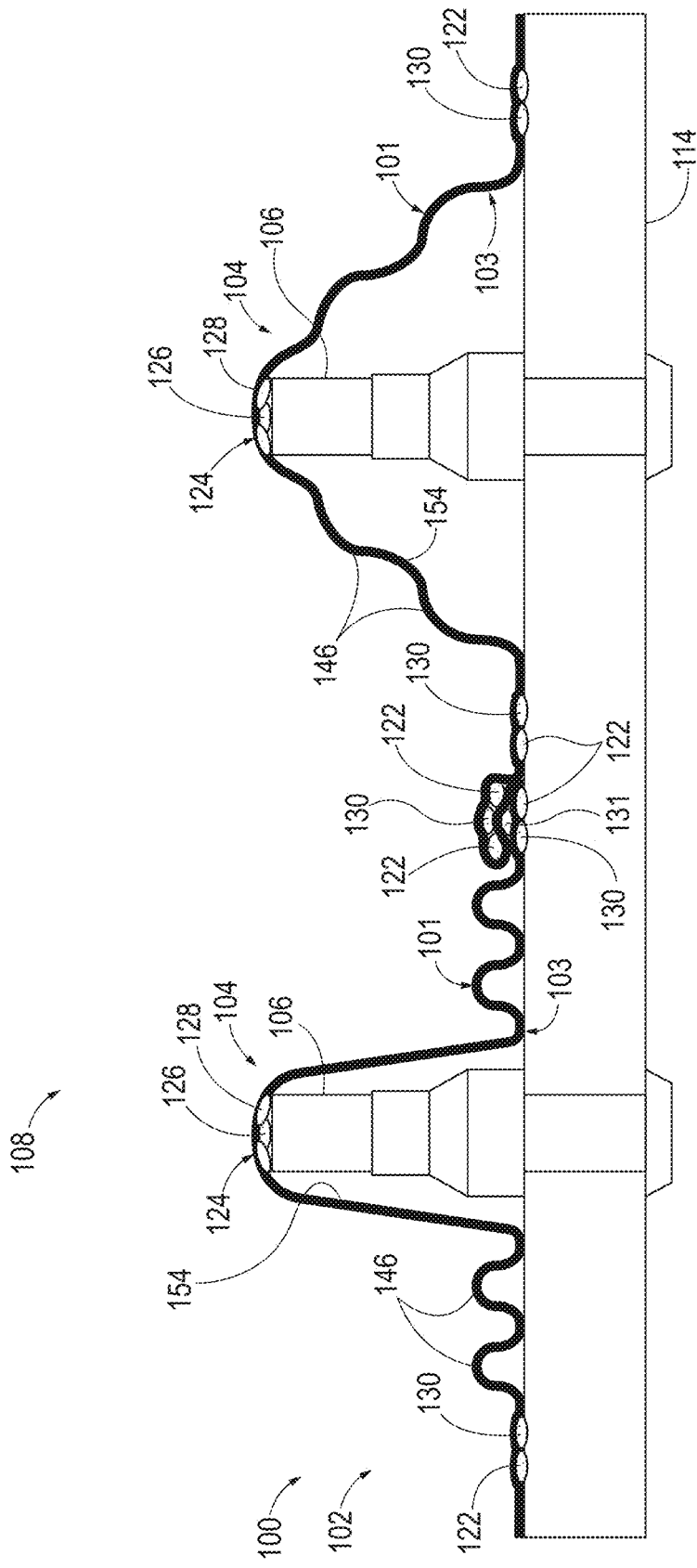
FIG. 8 is a schematic, cross-sectional side view of the aircraft fuel tank of FIG. 1, according to one or more examples of the subject matter, disclosed herein.

Also, as illustrated in FIGS. 7 and 8, in one or more examples, adhesive central regions 130 facilitate the coupling together of adjacent regions of reverse side 103 to reduce the spacing between adjacent ones of receptacles 104 to appropriately align with similarly spaced adjacent ones of fasteners 106.

Referring generally to FIG. 1, the following portion of this paragraph delineates example 8 of the subject matter, disclosed herein. According to example 8, which encompasses example 7, above, adhesive central regions 130 have a faster curing rate than adhesive edge regions 120 and adhesive cross regions 122.

Because adhesive central regions 130 cure faster than adhesive edge regions 120 and adhesive cross regions 122, ignition-suppressing device 100 is easily and properly positionable on wall 114 during installation, so that a long-term, stronger, and/or more chemically resistant bond subsequently can be established with adhesive edge regions 120 and adhesive cross regions 122 following initial placement of ignition-suppressing device 100.

Referring generally to FIG. 1 and particularly to, e.g., FIGS. 2 and 6-8 for illustrative purposes only and not by way of limitation, the following portion of this paragraph delineates example 9 of the subject matter, disclosed herein. According to example 9, which encompasses any one of examples 5 to 8, above, adhesive regions 110 further comprise adhesive fastener regions 124, located on reverse side 103 and spaced apart from one another along ignition-suppressing device 100. Each of adhesive fastener regions 124 is positioned within a respective one of receptacles 104.

Adhesive fastener regions 124 are therefore positioned to ensure that receptacles 104, once operatively positioned over fasteners 106, remain in place during and subsequent to installation of ignition-suppressing device 100.

Referring generally to FIG. 1 and particularly to, e.g., FIGS. 2 and 6-8 for illustrative purposes only and not by way of limitation, the following portion of this paragraph delineates example 10 of the subject matter, disclosed herein. According to example 10, which encompasses example 9, above, each of adhesive fastener regions 124 comprises first adhesive portion 126 and second adhesive portion 128. First adhesive portion 126 has a faster curing rate than second adhesive portion 128.

Inclusion of a faster-curing portion enables receptacles 104 to be operatively positioned and retained over fasteners 106 during installation of ignition-suppressing device 100, while inclusion of a slower-curing portion enables a long-term bond between receptacles 104 and fasteners 106 following initial positioning of receptacles 104 over fasteners 106.

Examples of slower curing adhesives for use as adhesive edge regions 120, adhesive cross regions 122, and second adhesive portion 128 of adhesive fastener regions 124 include polysulfide sealants, such as such as a polyurethanes, polythioethers, manganese dioxide cured polysulfides, dichromate cured polysulfides, epoxy cured polythioethers, etc., and combinations thereof. Examples of faster curing adhesives for use as adhesive central regions 130 and first adhesive portion 126 of adhesive fastener regions 124 include structural acrylic, epoxy, etc.

Figure 6:
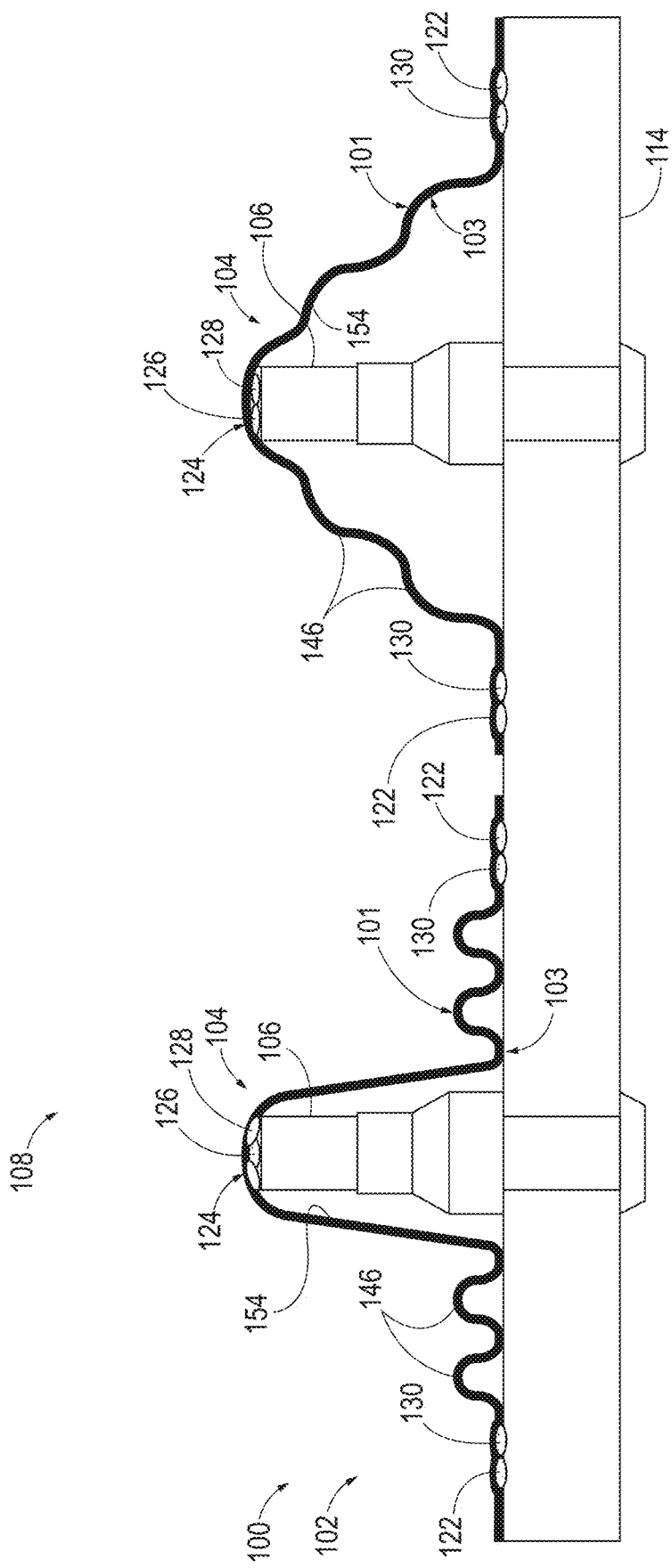
FIG. 6 is a schematic, cross-sectional side view of the aircraft fuel tank of FIG. 1, according to one or more examples of the subject matter, disclosed herein.

Referring generally to FIG. 1 and particularly to, e.g., FIG. 6 for illustrative purposes only and not by way of limitation, the following portion of this paragraph delineates example 11 of the subject matter, disclosed herein. According to example 11, which encompasses example 10, above, first adhesive portion 126 and second adhesive portion 128 are adjacent to each other.

By first adhesive portion 126 and second adhesive portion 128 of adhesive fastener regions 124 being adjacent to each other on reverse side 103 of ignition-suppressing device 100, manufacturing of ignition-suppressing device 100 is facilitated, such as by utilization of two adjacent nozzles of adhesive for dispensing of the respective adhesives onto reverse side 103 of ignition-suppressing device 100.

The adhesive fastener region illustrated on the right side of FIG. 6 is an example where first adhesive portion 126 and second adhesive portion 128 are adjacent to each other.

Referring generally to FIG. 1 and particularly to, e.g., FIGS. 2 and 6-8 for illustrative purposes only and not by way of limitation, the following portion of this paragraph delineates example 12 of the subject matter, disclosed herein. According to example 12, which encompasses example 10 or 11, above, first adhesive portion 126 and second adhesive portion 128 are concentric with each other.

By first adhesive portion 126 and second adhesive portion 128 of adhesive fastener regions 124 being concentric with each other on reverse side 103 of ignition-suppressing device 100, manufacturing of ignition-suppressing device 100 is facilitated, such as by utilization of a nozzle with concentric outlets for dispensing of the respective adhesives onto reverse side 103 of ignition-suppressing device 100.

The adhesive fastener region illustrated on the left side of FIG. 6 and the adhesive fastener regions 124 of FIGS. 7 and 8 are examples where first adhesive portion 126 and second adhesive portion 128 are concentric with each other.

Referring generally to FIG. 1 and particularly to, e.g., FIGS. 2, 8, and 9 for illustrative purposes only and not by way of limitation, the following portion of this paragraph delineates example 13 of the subject matter, disclosed herein. According to example 13, which encompasses any one of examples 5 to 12, above, adhesive regions 110 further comprise adhesive retaining regions 131, located on obverse side 101 and spaced apart from one another along ignition-suppressing device 100 and between receptacles 104.

As illustrated in FIG. 8, inclusion of adhesive retaining regions 131 on obverse side 101 of ignition-suppressing device 100 enables regions of ribbon 102 to be brought together and folded over onto an adjacent region of ribbon 102. As a result, the spacing between two adjacent ones of receptacles 104 is reduced to correspond to the spacing of two adjacent ones of fasteners 106, and the flap created by the bringing together of the regions of ribbon 102 is secured to the adjacent region of ribbon 102 by an adhesive retaining region, avoiding the flap extending into a volume of fuel within aircraft fuel tank 108, as illustrated, for example, in FIG. 7.

Referring generally to FIG. 1 and particularly to, e.g., FIG. 9 for illustrative purposes only and not by way of limitation, the following portion of this paragraph delineates example 14 of the subject matter, disclosed herein. According to example 14, which encompasses any one of examples 4 to 13, above, ignition-suppressing device 100 further comprises reverse-side release sheet 132, releasably coupled to reverse side 103 of ignition-suppressing device 100.

Reverse-side release sheet 132 restricts premature curing of adhesive regions 110 on reverse side 103 and permits handling and storage of ignition-suppressing device 100.

In one or more examples, reverse-side release sheet 132 is an aluminum tape. In one or more examples, reverse-side release sheet 132 is a polymeric film.

Referring generally to FIG. 1 and particularly to, e.g., FIG. 9 for illustrative purposes only and not by way of limitation, the following portion of this paragraph delineates example 15 of the subject matter, disclosed herein. According to example 15, which encompasses any one of examples 4 to 14, above, ignition-suppressing device 100 further comprises obverse-side release sheet 133, releasably coupled to obverse side 101 of ignition-suppressing device 100.

Obverse-side release sheet 133 restricts premature curing of adhesive regions 110 on obverse side 101 and permits handling and storage of ignition-suppressing device 100.

In one or more examples, obverse-side release sheet 133 is an aluminum tape. In one or more examples, obverse-side release sheet 133 is a polymeric film.

Referring generally to FIG. 1 and particularly to, e.g., FIG. 9 for illustrative purposes only and not by way of limitation, the following portion of this paragraph delineates example 16 of the subject matter, disclosed herein. According to example 16, which encompasses example 15, above, obverse-side release sheet 133 comprises openings 135, extending around receptacles 104.

Openings 135 enable obverse-side release sheet 133 to accommodate receptacles 104 that extend away from ribbon 102 in one or more examples.

In one or more examples, obverse-side release sheet 133 instead comprises multiple spaced-apart portions that are separately releasably coupled to ribbon 102 on obverse side 101 of ignition-suppressing device 100.

Figure 4:
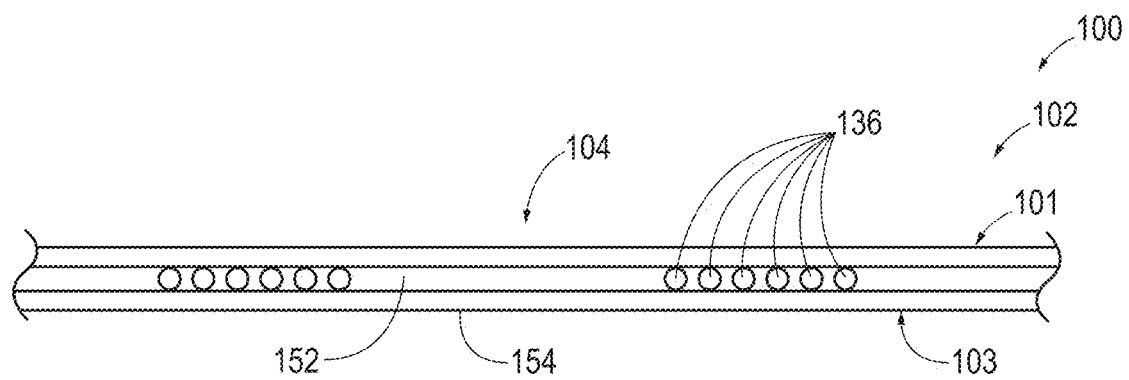
FIG. 4 is a schematic, cross-sectional side view of the ignition-suppressing device of FIG. 1, according to one or more examples of the subject matter, disclosed herein.
Figure 5:
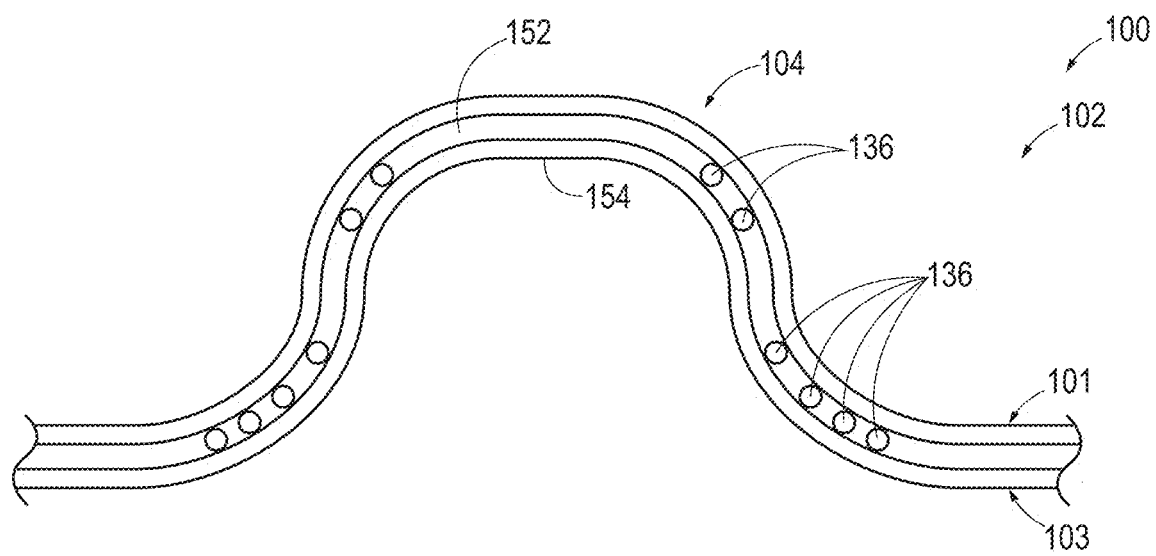
FIG. 5 is a schematic, cross-sectional side view of the ignition-suppressing device of FIG. 1, according to one or more examples of the subject matter, disclosed herein.

Referring generally to FIG. 1 and particularly to, e.g., FIGS. 4 and 5 for illustrative purposes only and not by way of limitation, the following portion of this paragraph delineates example 17 of the subject matter, disclosed herein. According to example 17, which encompasses any one of examples 4 to 16, above, each one of receptacles 104 comprises reverse surface 154, located on reverse side 103 of ignition-suppressing device 100. Any one of receptacles 104 is configured to extend away from ribbon 102 responsive to a predetermined pressure, applied to all of reverse surface 154 of that one of receptacles 104 and/or responsive to a predetermined force, applied to a portion of reverse surface 154 of that one of receptacles 104.

Accordingly, during a lightning strike or other electrical event in which hot gases are formed within a receptacle or hot particles are ejected from a fastener or near a fastener, the receptacle will expand as a result of the increase in pressure within the receptacle. As a result, the forces associated with the electrical event will be dampened, and the integrity of the receptacle will be maintained and able to operatively perform during subsequent electrical events.

In addition, in one or more examples, as illustrated in FIG. 9, ignition-suppressing device 100 is able to be easily spooled with receptacles 104 generally flattened into a collapsed conformation and selectively deployed to a deployed conformation when being positioned over fasteners 106 during installation. That is, fasteners 106 will engage a portion of reverse surface 154 and force the corresponding receptacle to extend away from the adjacent portion of ribbon 102 to create a volume within the corresponding receptacle into which the fastener extends.

Referring generally to FIG. 1 and particularly to, e.g., FIGS. 2, 3, and 6-8 for illustrative purposes only and not by way of limitation, the following portion of this paragraph delineates example 18 of the subject matter, disclosed herein. According to example 18, which encompasses example 17, above, each of receptacles 104 comprises at least one circular corrugation 146, extendable away from ribbon 102 responsive to an increase in pressure within receptacles 104.

The circular corrugations enable a greater increase in volume within receptacles 104 when an electrical event occurs. The circular corrugations also enable receptacles 104 to accommodate multiple sizes and/or shapes of fasteners 106.

In one or more examples, the circular corrugations are described as, or as forming, bellows.

Referring generally to FIG. 1 and particularly to, e.g., FIGS. 2 and 9 for illustrative purposes only and not by way of limitation, the following portion of this paragraph delineates example 19 of the subject matter, disclosed herein. According to example 19, which encompasses any one of examples 1 to 18, above, ribbon 102 comprises at least one weakened region 134, extending laterally across ribbon 102 between adjacent ones of receptacles 104.

Having at least one weakened region 134 between adjacent ones of receptacles 104, individual or subsets of receptacles 104 may be separated from a remainder of ignition-suppressing device 100 during installation thereof, such as following installation over a linear row of fasteners 106 and/or when the spacing between receptacles 104 is not aligned with the spacing of fasteners 106, over which receptacles 104 are being positioned.

In one or more examples, multiple weakened regions extend laterally across ribbon 102 between adjacent ones of receptacles 104.

By including multiple weakened regions, such as at least one weakened region 134, between adjacent ones of receptacles 104, different lengths of ribbon 102 may be selectively removed during installation of ignition-suppressing device 100 to correspond to various spacings of fasteners 106.

In one or more examples, in addition to or in place of the multiple weakened regions, indicia representing cut lines are provided to facilitate a technician separating adjacent regions of ignition-suppressing device 100 along a weakened region or cutting ignition-suppressing device 100 along the cut lines.

Referring generally to FIG. 1 and particularly to, e.g., FIGS. 2 and 9 for illustrative purposes only and not by way of limitation, the following portion of this paragraph delineates example 20 of the subject matter, disclosed herein. According to example 20, which encompasses example 19, above, at least one weakened region 134 comprises perforations 148.

Perforations 148 facilitate separation of adjacent portions of ignition-suppressing device 100 without the need for a tool, such as scissors or other cutter.

Referring generally to FIG. 1, the following portion of this paragraph delineates example 21 of the subject matter, disclosed herein. According to example 21, which encompasses example 19 or 20, above, at least one weakened region 134 comprises one or more score lines 150.

Score lines facilitate separation of adjacent portions of ignition-suppressing device 100 without the need for a tool, such as scissors or other cutter.

Referring generally to FIG. 1 and particularly to, e.g., FIGS. 4 and 5 for illustrative purposes only and not by way of limitation, the following portion of this paragraph delineates example 22 of the subject matter, disclosed herein. According to example 22, which encompasses any one of examples 1 to 21, above, each of receptacles 104 comprises substrate portion 152 and concentric rings 136, coupled to substrate portion 152.

Concentric rings 136 provide structure to maintain receptacles 104 in a generally circular configuration around fasteners 106 when ignition-suppressing device 100 is installed. Moreover, in one or more examples, concentric rings 136 facilitate receptacles 104 collapsing to a collapsed conformation, such as illustrated in FIGS. 4 and 9, and selectively deploying to a deployed conformation, such as illustrated in FIG. 5.

Referring generally to FIG. 1 and particularly to, e.g., FIGS. 4 and 5 for illustrative purposes only and not by way of limitation, the following portion of this paragraph delineates example 23 of the subject matter, disclosed herein. According to example 23, which encompasses example 22, above, concentric rings 136 are more rigid than substrate portion 152.

By being more rigid than substrate portion 152, concentric rings 136 provide structure to maintain receptacles 104 in a generally circular configuration around fasteners 106 when ignition-suppressing device 100 is installed.

Referring generally to FIG. 1 and particularly to, e.g., FIGS. 4 and 5 for illustrative purposes only and not by way of limitation, the following portion of this paragraph delineates example 24 of the subject matter, disclosed herein. According to example 24, which encompasses example 22 or 23, above, one of concentric rings 136 is different in diameter from at least one other one of concentric rings 136.

By having different diameters, concentric rings 136 not only facilitate the collapsing and expanding of receptacles 104, but also enable the tapering of receptacles toward the terminal ends of fasteners 106.

Referring generally to FIG. 1 and particularly to, e.g., FIGS. 6-8 for illustrative purposes only and not by way of limitation, the following portion of this paragraph delineates example 25 of the subject matter, disclosed herein. According to example 25, which encompasses any one of examples 1 to 24, above, aircraft fuel tank 108 comprises ignition-suppressing device 100, wall 114, and fasteners 106, extending inside aircraft fuel tank 108 from wall 114. Each of fasteners 106 is received by a respective one of receptacles 104 of ignition-suppressing device 100.

Referring generally to FIG. 10 and particularly to, e.g., FIGS. 1-9 for illustrative purposes only and not by way of limitation, the following portion of this paragraph delineates example 26 of the subject matter, disclosed herein. According to example 26, which encompasses example 25, above, method 200 of installing, in aircraft fuel tank 108, ignition-suppressing device 100 comprises (block 202) positioning each of fasteners 106, extending inside aircraft fuel tank 108 from wall 114 of aircraft fuel tank 108, within a respective one of receptacles 104 of ignition-suppressing device 100. Method 200 further comprises (block 204) coupling ignition-suppressing device 100 to wall 114.

Figure 12:
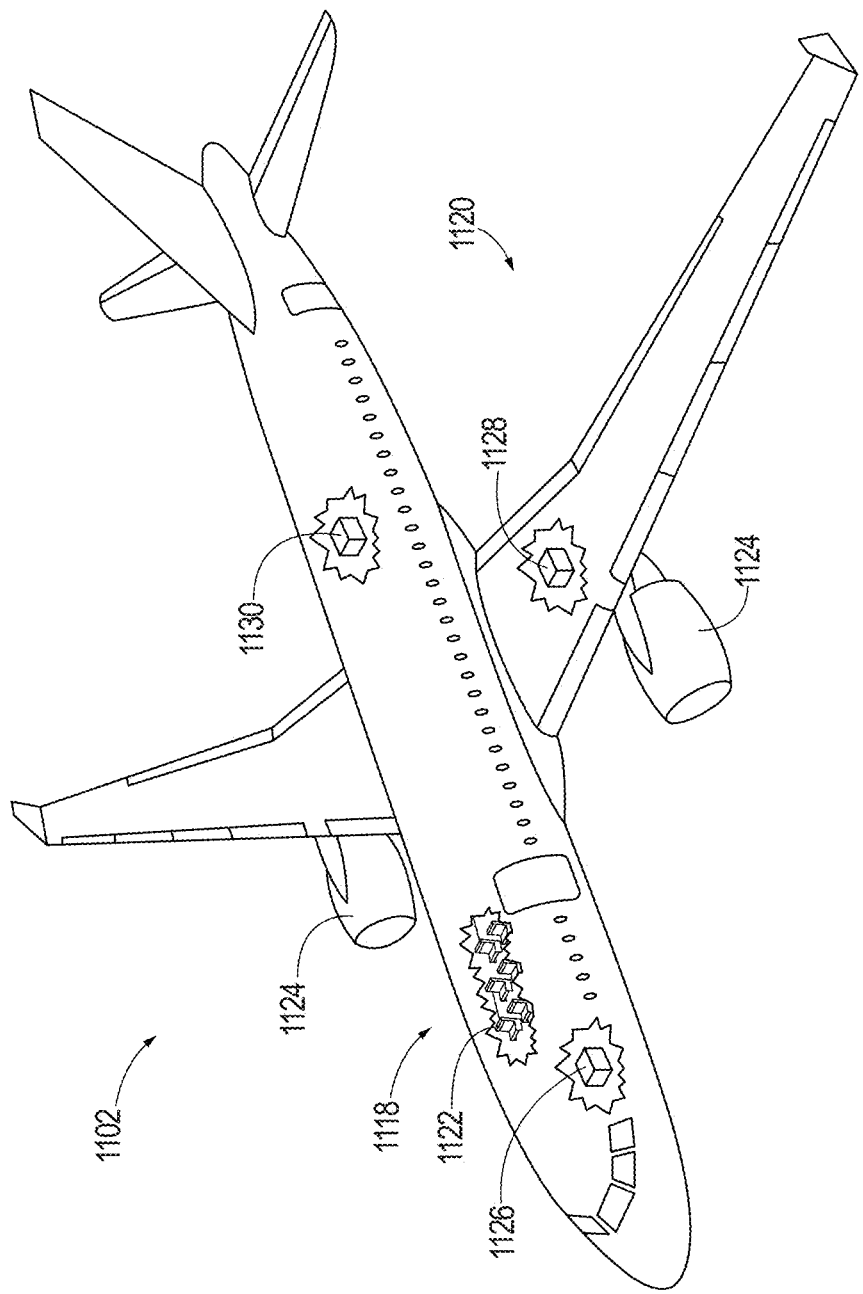
FIG. 12 is a schematic illustration of an aircraft.

Examples of the subject matter, disclosed herein may be described in the context of aircraft manufacturing and service method 1100 as shown in FIG. 11 and aircraft 1102 as shown in FIG. 12. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages 1108 and 1110, for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

The invention claimed is:

1. An ignition-suppressing device (100) for shielding fasteners (106), the ignition-suppressing device (100) comprising:
   a ribbon (102);
   receptacles (104), spaced apart from one another along the ribbon (102);
   an obverse side (101), a reverse side (103), and lateral sides (118) between the obverse side (101) and the reverse side (103); and
   adhesive regions (110).

2. The ignition-suppressing device (100) according to claim 1, wherein:
   the receptacles (104) are permeable to gases and impermeable to aircraft fuel.

3. The ignition-suppressing device (100) according to claim 1, wherein the receptacles (104) are permeable to gases and permeable to aircraft fuel.

4. The ignition-suppressing device (100) according to claim 1, wherein the adhesive regions (110) comprise adhesive edge regions (120), located on the reverse side (103) and extending along and adjacent to the lateral sides (118).

5. The ignition-suppressing device (100) according to claim 4, wherein the adhesive regions (110) further comprise adhesive cross regions (122), located on the reverse side (103), extending transversely to the adhesive edge regions (120) between the lateral sides (118), and spaced apart from one another along the ignition-suppressing device (100) between the receptacles (104).

6. The ignition-suppressing device (100) according to claim 5, wherein:
   the adhesive regions (110) further comprise adhesive central regions (130), located on the reverse side (103) and spaced apart from one another along the ribbon (102); and
   each of the adhesive central regions (130) is positioned between the adhesive edge regions (120).

7. The ignition-suppressing device (100) according to claim 6, wherein the adhesive central regions (130) have a faster curing rate than the adhesive edge regions (120) and the adhesive cross regions (122).

8. The ignition-suppressing device (100) according to claim 4, wherein:
   the adhesive regions (110) further comprise adhesive fastener regions (124), located on the reverse side (103) and spaced apart from one another along the ignition-suppressing device (100); and each of the adhesive fastener regions (124) is positioned within a respective one of the receptacles (104).

9. The ignition-suppressing device (100) according to claim 8, wherein:
each of the adhesive fastener regions (124) comprises a first adhesive portion (126) and a second adhesive portion (128); and
the first adhesive portion (126) has a faster curing rate than the second adhesive portion (128).

10. The ignition-suppressing device (100) according to claim 9, wherein the first adhesive portion (126) and the second adhesive portion (128) are adjacent to each other.

11. The ignition-suppressing device (100) according to claim 9, wherein the first adhesive portion (126) and the second adhesive portion (128) are concentric with each other.

12. The ignition-suppressing device (100) according to claim 4, wherein the adhesive regions (110) further comprise adhesive retaining regions (131), located on the obverse side (101) and spaced apart from one another along the ignition-suppressing device (100) and between the receptacles (104).

13. The ignition-suppressing device (100) according to claim 1, further comprising a reverse-side release sheet (132), releasably coupled to the reverse side (103) of the ignition-suppressing device (100).

14. The ignition-suppressing device (100) according to claim 1, further comprising an obverse-side release sheet (133), releasably coupled to the obverse side (101) of the ignition-suppressing device (100).

15. The ignition-suppressing device (100) according to claim 1, wherein:
each one of the receptacles (104) comprises a reverse surface (154), located on the reverse side (103) of the ignition-suppressing device (100), and
any one of the receptacles (104) is configured to extend away from the ribbon (102) responsive to a predetermined pressure, applied to all of the reverse surface (154) of that one of the receptacles (104) and/or responsive to a predetermined force, applied to a portion of the reverse surface (154) of that one of the receptacles (104).

16. The ignition-suppressing device (100) according to claim 1, wherein each of the receptacles (104) comprises a substrate portion (152) and concentric rings (136), coupled to the substrate portion (152).

17. An aircraft fuel tank (108), comprising:
the ignition-suppressing device (100) according to claim 1;
a wall (114); and
the fasteners (106), extending inside the aircraft fuel tank (108) from the wall (114) of the aircraft fuel tank (108), wherein each of the fasteners (106) is received by a respective one of the receptacles (104) of the ignition-suppressing device (100).

18. A method (200) of installing, in the aircraft fuel tank (108) according to claim 17, the ignition-suppressing device (100), the method comprising steps of:
positioning each of the fasteners (106), extending inside the aircraft fuel tank (108) from the wall (114) of the aircraft fuel tank (108), within a respective one of the receptacles (104) of the ignition-suppressing device (100); and
coupling the ignition-suppressing device (100) to the wall (114).

19. The ignition-suppressing device (100) according to claim 1, wherein the ribbon (102) comprises at least one weakened region (134), extending laterally across the ribbon (102) between adjacent ones of the receptacles (104).

20. An ignition-suppressing device (100) for shielding fasteners (106), the ignition-suppressing device (100) comprising:
a ribbon (102); and
receptacles (104), spaced apart from one another along the ribbon (102);
wherein the ribbon (102) comprises at least one weakened region (134), extending laterally across the ribbon (102) between adjacent ones of the receptacles (104).

21. The ignition-suppressing device (100) according to claim 20, wherein the at least one weakened region (134) comprises perforations (148).

22. The ignition-suppressing device (100) according to claim 20, wherein the at least one weakened region (134) comprises one or more score lines (150).

23. The ignition-suppressing device (100) according to claim 20, wherein the receptacles (104) are permeable to gases and permeable to aircraft fuel.

24. The ignition-suppressing device (100) according to claim 20, wherein the receptacles (104) are permeable to gases and impermeable to aircraft fuel.

25. The ignition-suppressing device (100) according to claim 20, wherein each of the receptacles (104) comprises a substrate portion (152) and concentric rings (136), coupled to the substrate portion (152).

26. An aircraft fuel tank (108), comprising:
the ignition-suppressing device (100) according to claim 20;
a wall (114); and
the fasteners (106), extending inside the aircraft fuel tank (108) from the wall (114) of the aircraft fuel tank (108), wherein each of the fasteners (106) is received by a respective one of the receptacles (104) of the ignition-suppressing device (100).

27. A method (200) of installing, in the aircraft fuel tank (108) according to claim 26, the ignition-suppressing device (100), the method comprising steps of:
positioning each of the fasteners (106), extending inside the aircraft fuel tank (108) from the wall (114) of the aircraft fuel tank (108), within a respective one of the receptacles (104) of the ignition-suppressing device (100); and
coupling the ignition-suppressing device (100) to the wall (114).

* * * * *